Sept. 24, 1968　　　R. W. SANTWAY ETAL　　　3,403,305
ELECTROLYTIC CAPACITOR HAVING AN ELECTROLYTE
CONTAINING A BORATE COORDINATION COMPOUND
Filed Nov. 10, 1966
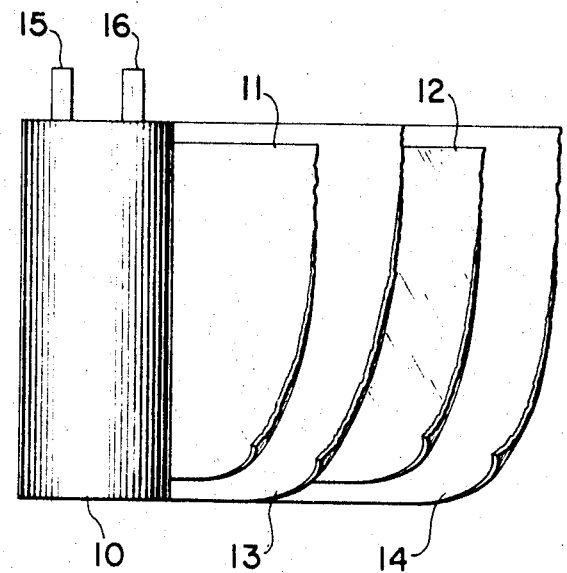

United States Patent Office 3,403,305
Patented Sept. 24, 1968

3,403,305
ELECTROLYTIC CAPACITOR HAVING AN ELECTROLYTE CONTAINING A BORATE COORDINATION COMPOUND
Robert W. Santway, Bennington, Vt., and Robert S. Alwitt, Williamstown, Mass., assignors to Sprague Electric Company, North Adams, Mass., a corporation of Massachusetts
Filed Nov. 10, 1966, Ser. No. 593,460
12 Claims. (Cl. 317—230)

ABSTRACT OF THE DISCLOSURE

An electrolytic capacitor containing a new electrolyte comprising a solvent having dissolved therein a compound of the formula selected from the group consisting of:

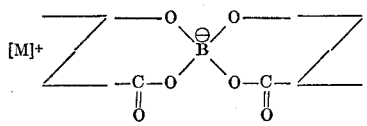

and

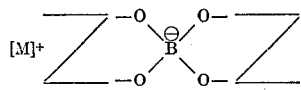

wherein M is a hydrogen ion, alkali metal ion, ammonium ion or $C_1$–$C_{18}$ hydrocarbyl amine ion and Z is a vicinally substituted aryl group.

---

The present invention relates to an electrolytic capacitor and more particularly to a capacitor containing a new electrolyte.

Electrolytic capacitors have been the subject of extended research and large scale use during the last half century. Most capacitors of this type have been made with anodes consisting of aluminum and tantalum foils or sintered tantalum pellets having a thin dielectric coating of oxide. The patent and technical literature abound with suggested ionogens as well as solvents for them which are useful as forming and/or working electrolytes for electrolytic capacitors. Of this multitude of electrolytes which have been disclosed, few have achieved commercial significance. At present, most electrolytic capacitors employ either relatively simple borate and water systems, or else rather complex borate systems which contain anion species other than the simple borate in a suitable organic solvent. Many prior art electrolytes, e.g. ammonium pentaborate in ethylene glycol, dissolve anodic aluminum oxide to a considerable degree upon heating at or from 85° C.

In general, this invention provides an electrolytic capacitor containing an electrolyte comprising a solvent having dissolved therein a compound of the formula selected from the group consisting of:

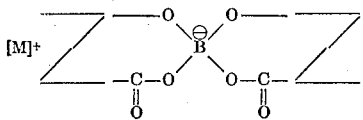

and

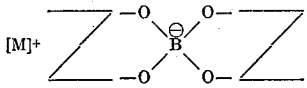

wherein M is a hydrogen ion, alkali metal ion, ammonium ion or $C_1$–$C_{18}$ hydrocarbyl amine ion and Z is a vicinally substituted aryl group. The electrolytes employed herein show no or negligible dissolution of anodic aluminum oxide. The electrolytes also are excellent formation electrolytes.

It is therefore an object of the present invention to provide a relatively simple, alternative electrolyte system, capable of being substituted for ones presently in use.

It is a further object of the present invention to provide a capacitor employing an electrolyte which does not attack anodic aluminum oxide at elevated temperatures.

Another object of the present invention is the provision of an electrolytic capacitor capable of long term reliable operation under temperature conditions varying from —55° C. up to 125° C.

Other objects and advantages of the present invention will be made obvious to those skilled in the art by the following description when considered in relation to the appended drawing in which the sole figure represents a partially unwound capacitor section of the invention.

Referring to the appended drawing, anode 11 of the capacitor unit 10 is of a valve metal having on its surface an oxide layer which functions as the dielectric. Cathodic contact 12 is of a valve or inert metal, as desired. Porous spacers 13 and 14 are fully impregnated with the electrolyte compositions of this invention. Tabs 15 and 16 are connected to the electrode foil 11 and cathodic contact foil 12 respectively as terminals. The following examples illustrate the more detailed practice of the invention but are not to be construed as limiting.

Example I

This is an example of the in situ formation of tributylammonium borodicatecholate. A mixture of pyrocatechol (2.2 g.), boric acid (0.6 g.) and tributylamine (1.85 g.) was dissolved in dimethylformamide (100 g.). This electrolyte was introduced into aluminum electrolytic capacitors of conventional design. The capacitance sections impregnated with the electrolyte possessed the rating of 100 μf., 60 volts D.C. The following values given are averages of 6 units during a test at 125° C. with 60 volts applied.

|  | C (μf) | RC (ohm-μf) | I (μa) |
|---|---|---|---|
| Initial | 112 | 44 | 1.1 |
| 500 hours | 110 | 40 | 1.9 |
| 1,000 hours | 110 | 40 | 2.9 |

The foregoing data indicate that the capacitors are electrically stable although they show some increase in leakage current with time.

Example II

An electrolyte was prepared by dissolving 4% tetramethylammonium borodicatecholate in dimethylformamide. Two groups of commercial aluminum foil, 5 volt and 75 volt capacitance sections, were impregnated with this electrolyte. The following table gives life test data obtained at 125° C. The values given are averages of 5 units of each rating.

| Hours | 5 volt | | | 75 volt | | |
|---|---|---|---|---|---|---|
|  | Capacitance | R x C | I (μa) | Capacitance | R x C | I (μa) |
| 0 | 237 | 149 | 0.8 | 35.3 | 42 | 3.3 |
| 500 | 228 | 145 | 0.7 | 35.1 | 44 | 0.5 |
| 1,000 | 224 | 139 | 1.0 | 35.1 | 47 | 1.8 |
| 2,000 | 220 | 132 | 0.7 | 34.8 | 52 | 1.5 |

The foregoing data indicate the capacitors are electrically stable and improve somewhat with time from a leakage current standpoint.

Example III

An electrolyte was prepared by dissolving 8% of benzyltrimethylammonium borodisalicylate in dimethylformamide. A group of commercial aluminum foil 50 volt units was impregnated with this electrolyte. The following life test data was obtained at 85° C. The values given are the averages for 5 units.

| Hours | 50 volt | | |
|---|---|---|---|
| | Capacitance ($\mu f$) | R x C (ohm-$\mu f$) | I ($\mu a$) |
| 0 | 77.5 | 30 | 1.8 |
| 500 | 77.2 | 32 | 0.7 |
| 1,000 | 77.0 | 33 | 0.9 |
| 2,000 | 76.5 | 34 | 0.7 |

As in the previous example, the results indicate electrical stability with a good improvement in leakage current over the duration of the test period.

Example IV

This is an example of the in situ formation of sodium borodisalicylate in ethylene cyanohydrin. A mixture of 3.86 g. of salicylic acid, 4.48 g. of sodium salicylate and 1.74 g. of boric acid was dissolved in 100 ml. of ethylene cyanohydrin.

The electrolyte was introduced into aluminum electrolytic capacitors of conventional design rated at 500 $\mu f$., 50 v. DC. The following values given are averages of 5 units.

| Time | 50 v. DC | | |
|---|---|---|---|
| | Capacitance ($\mu f$) | RC (ohm-$\mu f$) | I ($\mu a$) |
| Initial | 640 | 138 | 27 |
| 72 hr. shelf test (85° C.) | 633 | 102 | 22 |
| 1,000 hr. life test (85° C.) | 636 | 118 | 3.8 |
| 250 hr. life test (105° C.) | 637 | 112 | 5.5 |

It is seen that electrical measurements are very consistent and the values indicate this is a good electrolyte.

Example V

This is an example of the in situ formation of sodium borodicatecholate in ethyl Cellosolve. A mixture of 0.01 mole of sodium hydroxide, 0.01 mole of boric acid and 0.02 mole of catechol was dissolved in 1.11 moles of ethyl Cellosolve.

The capacitance (measured at 120 hertz) of five etched but non-anodized aluminum foils, measuring 1″ x 1¼″ x 0.003″, averaged 502 $\mu f$. The foils were then anodized in the subject electrolyte at 0.6 ma./in.$^2$ for 14 minutes. The potential across the cell increased to 50 volts. The capacitance of the five anodized foils, measured under the same conditions as above, averaged 35.6 $\mu f$. The resistivity of the electrolyte was 1920 ohm-cm. This example illustrates that the electrolyte is a good formation electrolyte.

Example VI

This is an example of the in situ formation of ammonium borodicatecholate in dimethylformamide. A mixture of 0.01 mole of ammonium hydroxide, 0.01 mole of boric acid and 0.02 mole of catechol was dissolved in 1.37 moles of dimethylformamide.

The capacitance (measured at 120 hertz) of five etched but non-anodized aluminum foils measuring 1″ x 1¼″ x 0.003″, averaged 500 $\mu f$. The foils were then anodized in the above electrolyte at 0.6 ma./in.$^2$ for 22 minutes. The potential across the cell increased to 50 volts. The capacitance of the five anodized foils, measured under the same conditions as above, averaged 33.6 $\mu f$. The resistivity of the electrolyte was 606 ohm-cm. The example illustrates that this electrolyte is also a good formation electrolyte.

Example VII

An electrolyte was prepared by dissolving 0.01 mole of di-isopropylammonium borodisalicylate in 1.37 moles of dimethylformamide.

The capacitance (measured at 120 hertz) of five etched but non-anodized aluminum foils, measuring 1″ x 1¼″ x 0.003″, averaged 510 $\mu f$. The foils were then anodized in the electrolyte at 0.6 ma./in.$^2$ for 54 minutes. The potential across the cell increased to 50 volts. The capacitance of the five anodized foils, measured under the same conditions as above, averaged 36.7 $\mu f$. The resistivity of the electrolyte was 312 ohm-cm. The data show that this is an effective electrolyte.

Example VIII

This is an example of the in situ formation of ammonium borodisalicylate. A mixture of 0.01 mole of ammonium hydroxide, 0.01 mole of boric acid and 0.02 mole of salicylic acid was dissolved in 1.37 moles of dimethylformamide.

The capacitance (measured at 120 hertz) of five etched but non-anodized aluminum foils, measuring 1″ x 1¼″ x 0.003″, averaged 511 $\mu f$. The foils were then anodized in the electrolyte of this example at 0.6 ma./in.$^2$ for 21 minutes. The potential across the cell increased to 50 volts. The capacitance of the five anodized foils, measured under the same conditions as above, averaged 30.0 $\mu f$. The resistivity of the electrolyte was 385 ohm-cm. The electrolyte is an effective formation electrolyte.

Example IX

This is an example of the in situ formation of 2-ethylhexylammonium borodisalicylate in dimethylformamide. A mixture of 0.01 mole of 2-ethylhexylamine, 0.01 mole of boric acid and 0.02 mole of salicylic acid was dissolved in 1.37 moles of dimethylformamide. The capacitance (measured at 120 hertz) of five etched but non-anodized aluminum foils, measuring 1″ x 1¼″ x 0.003″, averaged 434 $\mu f$. The foils were then anodized in the present electrolyte at 0.6 ma./in.$^2$ for 23 minutes. The potential across the cell increased to 50 volts. The capacitance of the five anodized foils, measured under the same conditions, averaged 30.1 $\mu f$. The resistivity of the electrolyte was 341 ohm-cm.

Example X

This is an example of the in situ formation of tributylammonium borodisalicylate. The mixture of 0.01 mole of tributylamine, 0.01 mole of boric acid and 0.02 mole of salicylic acid was dissolved in 1.37 moles of dimethylformamide. The capacitance (measured at 120 hertz) of five etched but non-anodized foils, measuring 1″ x 1¼″ x 0.003″, averaged 451 $\mu f$. The foils were then anodized in the present electrolyte at 0.6 ma./in.$^2$ for 21 minutes. The potential across the cell increased to 50 volts. The capacitance of the five anodized foils, measured under the same conditions, averaged 29.3 $\mu f$. The resistivity of the electrolyte was 363 ohm-cm.

Example XI

This is an example of the in situ formation of 2-ethylhexylammonium borodicatecholate in dimethylformamide. A mixture of 0.01 mole of 2-ethylhexylamine, 0.01 mole of boric acid and 0.02 mole of catechol was dissolved in 1.37 moles of dimethylformamide.

The capacitance (measured at 120 hertz) of five etched but non-anodized aluminum foils, measuring 1″ x 1¼″ x 0.003″, averaged 500 $\mu f$. The foils were then anodized in the present electrolyte at 0.6 ma./in.$^2$ for 22 minutes. The potential across the cell increased to 50 volts. The capacitance of the five anodized foils, measured under the same conditions, averaged 31.7 $\mu f$. The resistivity of the electrolyte was 308 ohm-cm.

Example XII

This is an example of the in situ formation of hydrogen borodisalicylate in dimethylformamide. A mixture of 0.01 mole of boric acid and 0.02 mole of salicylic acid was dissolved in 1.37 moles of dimethylformamide. The capacitance (measured at 120 hertz) of five etched but non-anodized aluminum foils, measuring 1″ x 1¼″ x 0.003″, averaged 503 $\mu f$. The foils were then anodized in the present electrolyte at 0.6 ma./in.$^2$ for 20 minutes. The capacitance of the five anodized foils, measured under the same conditions, averaged 32.7 µf. The resistivity of the electrolyte was 353 ohm-cm.

Example XIII

This is an example of the in situ formation of hydrogen borodicatecholate. A mixture of 0.01 mole of boric acid and 0.02 mole of pyrocatechol was dissolved in 1.37 moles of dimethylformamide. The capacitance (measured at 120 hertz) of five etched but non-anodized aluminum foils, measuring 1″ x 1¼″ x 0.003″, averaged 501 µf. The foils were then anodized in the present electrolyte at 0.6 ma./in.$^2$ for 20 minutes. The capacitance of the five anodized foils, measured under the same conditions, averaged 47.0 µf. The resistivity of the electrolyte was 2881 ohm-cm.

Example XIV

This is an example of the in situ formation of diisopropylammonium borodi 2,3-naphthalenediolate. A mixture of 1 gram of di-isopropylamine, 0.6 gram of boric acid and 3.2 grams of 2,3-naphthalenediol was dissolved in 100 grams of dimethylformamide. This electrolyte was introduced into aluminum electrolytic capacitors of conventional design. The capacitance sections impregnated with the electrolyte possessed the rating of 157 µf., 50 volts D.C. The following values given are averages of 6 units during a test at 125° C. with 50 volts applied.

|  | C (µf) | RC (ohm-µf) | I (µa) |
|---|---|---|---|
| Initial | 157 | 52 | 1.6 |
| 216 hours | 154 | 52 | 1.4 |
| 500 hours | 153 | 52 | 1.4 |

The foregoing data indicate that the capacitors are electrically stable.

Past experience has indicated that many prior art electrolytes, e.g. ammonium pentaborate in ethylene glycol, dissolve anodic aluminum oxide to a considerable degree upon heating at or above 85° C. This characteristic is obviously undesirable. The electrolytes shown in Examples II, III, IV, VII and XIV were tested in this regard and showed no or negligible dissolution of anodic aluminum oxide.

By the term hydrocarbyl is meant an alkyl or aryl radical. It is to be understood that by $C_1$–$C_{18}$ hydrocarbyl amine salts, it is meant to include primary, secondary and tertiary amine salts. The hydrocarbyl groups in either the amine salt or the quarternary ammonium salt can be either the same group or different groups. By vicinally substituted aryl group is meant an ortho disubstituted benzene ring or a 1,2 or 2,3 disubstituted naphthalene ring. It is to be understood that noninterfering substituents may be present on the aryl group. The electrolyte systems contemplated herein are not limited to those wherein the solvent is dimethylformamide, ethylene cyanohydrin, or ethyl Cellosolve since other solvents and mixtures may be employed. For example, water, formamide, the Cellosolves, glycols, etc. and mixtures thereof may be employed. It is also to be understood that the electrolytes of the present invention have utility in capacitors other than aluminum capaciors, e.g. tantalum, niobium, etc.

Since it is obvious that many changes and modifications can be made in the above-described details without departing from the nature and spirit of the invention, it is to be understood that the invention is not limited to said details except as set forth in the appended claims.

What is claimed is:

1. An electrolytic capacitor comprising a capacitance section having a plurality of electrodes, at least one electrode being a valve metal having on its surface an insulating oxide layer, said section being impregnated with an electrolyte consisting essentially of a solvent having dissolved therein a compound having a formula selected from the group consisting of:

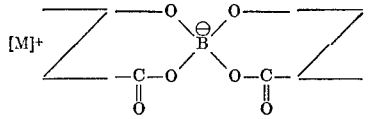

and

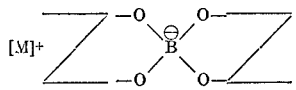

wherein M is a hydrogen, alkali metal, ammonium or $C_1$–$C_{18}$ hydrocarbyl amine and Z is a vicinally substituted aryl group.

2. The capacitor of claim 1 wherein said compound is tributylammonium borodicatecholate.
3. The capacitor of claim 1 wherein said compound is sodium borodisalicylate.
4. The capacitor of claim 1 wherein said compound is ammonium borodicatecholate.
5. The capacitor of claim 1 wherein said compound is di-isopropylammonium borodisalicylate.
6. The capacitor of claim 1 wherein said compound is ammonium borodisalicylate.
7. The capacitor of claim 1 wherein said compound is 2-ethylhexylammonium borodisalicylate.
8. The capacitor of claim 1 wherein said compound is a tributylammonium borodisalicylate.
9. The capacitor of claim 1 wherein said compound is 2-ethylhexylammonium borodicatecholate.
10. The capacitor of claim 1 wherein said compound is hydrogen borodisalicylate.
11. The capacitor of claim 1 wherein said compound is hydrogen borodicatecholate.
12. The capacitor of claim 1 wherein said compound is di-isopropylammonium borodi 2,3-naphthalenediolate.

References Cited

UNITED STATES PATENTS

| 1,976,700 | 10/1934 | Lilienfeld | 317—230 |
| 3,009,941 | 11/1961 | Brotherton | 260—462 |

JAMES D. KALLAM, *Primary Examiner.*